(12) United States Patent
Severinsson

(10) Patent No.: US 9,120,479 B2
(45) Date of Patent: Sep. 1, 2015

(54) ELECTRICAL AXLE

(75) Inventor: Lars Severinsson, Hishult (SE)

(73) Assignee: BorgWarner TorqTransfer Systems AB, Landskrona (SE)

(*) Notice: Subject to any disclaimer, the term of this patent is extended or adjusted under 35 U.S.C. 154(b) by 26 days.

(21) Appl. No.: 13/885,331

(22) PCT Filed: Nov. 16, 2011

(86) PCT No.: PCT/EP2011/070253
§ 371 (c)(1),
(2), (4) Date: Jun. 14, 2013

(87) PCT Pub. No.: WO2012/066035
PCT Pub. Date: May 24, 2012

(65) Prior Publication Data
US 2014/0148307 A1 May 29, 2014

(30) Foreign Application Priority Data

Nov. 16, 2010 (SE) ........................................ 1051198
Dec. 17, 2010 (SE) ........................................ 1051343

(51) Int. Cl.
| | |
|---|---|
| *B60K 6/445* | (2007.10) |
| *F16H 48/36* | (2012.01) |
| *B60W 10/16* | (2012.01) |
| *B60K 1/02* | (2006.01) |
| *B60K 6/52* | (2007.10) |
| *B60L 15/20* | (2006.01) |
| *B60W 10/08* | (2006.01) |
| *B60K 1/00* | (2006.01) |

(52) U.S. Cl.
CPC ................ *B60W 10/16* (2013.01); *B60K 1/02* (2013.01); *B60K 6/52* (2013.01); *B60L 15/2036* (2013.01); *B60W 10/08* (2013.01); *F16H 48/36* (2013.01); *B60K 6/445* (2013.01); *B60K 2001/001* (2013.01); *B60L 2220/42* (2013.01); *B60L 2220/46* (2013.01); *B60L 2240/423* (2013.01); *B60L 2260/28* (2013.01); *F16H 2048/364* (2013.01); *Y02T 10/6265* (2013.01); *Y02T 10/646* (2013.01); *Y02T 10/648* (2013.01); *Y02T 10/7275* (2013.01); *Y10T 477/347* (2015.01)

(58) Field of Classification Search
CPC ................ F16H 48/36; F16H 2048/34; F16H 2048/343; F16H 2048/346; F16H 2048/364; B60K 6/445
USPC ........... 475/1–10, 149, 150; 180/65.235, 65.6
See application file for complete search history.

(56) References Cited

U.S. PATENT DOCUMENTS 5,067,932 A   11/1991  Edwards
5,509,491 A *  4/1996  Hall, III ........................ 180/9.44
(Continued)

FOREIGN PATENT DOCUMENTS

| DE | 102007023462 | 11/2008 |
| WO | 20070097086 | 8/2007 |
| WO | 20100101506 | 9/2010 |

*Primary Examiner* — Tisha Lewis
(74) *Attorney, Agent, or Firm* — BrooksGroup

(57) ABSTRACT

An electrical axle for a four wheeled road vehicle with an electrical propulsion motor arranged coaxially on the axle. A first planetary gear is connected to the electrical propulsion motor and to a first side of the axle. A second planetary gear is connected to the electrical propulsion motor and to a second side of the axle. The first and second planetary gears form a differential mechanism. A torque vectoring unit includes an electrical motor arranged coaxially on the axle for providing a change in torque distribution between the first side and the second side of the axle. The electrical motor of the torque vectoring unit is connected to the first and second planetary gears.

12 Claims, 7 Drawing Sheets

(56) References Cited

U.S. PATENT DOCUMENTS

| | | | |
|---|---|---|---|
| 5,575,730 A * | 11/1996 | Edwards et al. | 475/5 |
| 5,851,162 A | 12/1998 | Tether | |
| 6,491,599 B1 * | 12/2002 | Schmidt | 475/5 |
| 7,074,151 B2 * | 7/2006 | Thompson | 475/225 |
| 7,344,469 B2 * | 3/2008 | Sharma et al. | 475/221 |
| 7,481,730 B2 * | 1/2009 | Pesiridis et al. | 475/5 |
| 2007/0093342 A1 | 4/2007 | Pesiridis et al. | |

\* cited by examiner

ELECTRICAL AXLE

This application claims the benefit of Swedish Application No. 1051198-8 filed Nov. 16, 2010, Swedish Application No. 1051343-0 filed Dec. 17, 2010 and PCT Application No, EP2011/070253 filed Nov. 16, 2011.

TECHNICAL FIELD

The present invention relates to an electrical axle of a four wheeled vehicle. More particularly, the present invention relates to an electrical axle having a torque vectoring unit for providing a torque difference between a right wheel and a left wheel of said axle.

BACKGROUND

For road vehicles it is desirable to be able to distribute different drive torque to different wheels for improving the vehicle stability and/or performance. Torque vectoring units for road vehicles are thus known which purpose is to cause the drive torque distribution of a vehicle to change.

Such torque vectoring devices are arranged to shuffle drive torque laterally on a driven axle, or longitudinally between a driven axle and a non-driven axle.

In order to obtain the desired result with regard to the driving dynamics, it may in certain situations be advantageous to provide a drive wheel with a positive torque in relation to the other drive wheel on the driving axle. Such a positive torque may be obtained in a way known per se by a mechanical gear device for gearing-up or increasing the rotational speed of the drive shaft for the wheel in question by for example 10%.

Many examples of such mechanical gear devices are known. In such arrangements being both heavy and expensive, torque vectoring devices are arranged at either side of the central differential for the two drive shafts.

Hence, when a differential rotational speed between two wheels is requested the prior art devices are affecting the rotational speed relative the absolute rotational speed, leading to heavy devices having a relatively high power consumption.

In view of this, the applicant has previously presented a torque vectoring unit which overcomes the above mentioned drawbacks. Such unit, fully disclosed in WO2010101506, includes an electrical motor coupled to a driven axle of a road vehicle such that, upon activation, it provides a positive torque to one wheel and an opposite torque to another wheel, each wheels being disposed on the same axle.

The torque vectoring unit is arranged on a driven axle of the vehicle. The propulsion force may be provided by means of an electrical motor, such that the torque vectoring unit is operating on an electrical axle of the vehicle. Such electrical axles are highly attractive for providing four-wheeled drive in e.g. a hybrid car, i.e. a vehicle being equipped with a first transmission for providing propulsion torque to the front axle, and a second transmission for providing propulsion torque to the rear axle.

Although the previously presented unit is highly attractive, the increasing demands of the industry require improvements relating to performance, simplicity, space requirements, cost etc. Therefore, there is a need for an electrical axle with a torque vectoring unit, said electrical axle being more compact and more cost effective.

SUMMARY

Accordingly, the present invention preferably seeks to mitigate, alleviate or eliminate one or more of the above-identified deficiencies in the art and disadvantages singly or in any combination and solves at least the above-mentioned problems by providing a device according to the appended claims.

It is thus an object of the invention to provide an electrical axle with a torque vectoring unit, which overcomes the above mentioned problems.

A further object of the present invention is to provide an electrical axle with a torque vectoring unit which provides a higher gear ratio.

Moreover, an object of the present invention is to provide an electrical axle with a torque vectoring device which has a significantly reduced size.

According to a first aspect, an electrical axle for a four wheeled road vehicle is provided. The electrical axle comprises an electrical propulsion motor arranged coaxially on said axle, a first planetary gear connected to said electrical propulsion motor and to a first side of said axle, and a second planetary gear connected to said electrical propulsion motor and to a second side of said axle, said first and second planetary gears is forming a differential mechanism, and a torque vectoring unit comprising an electrical motor arranged coaxially on said axle for providing a change in torque distribution between said first side and said second side of said axle, wherein said electrical motor of said torque vectoring unit is connected to the first and second planetary gears.

According to a second aspect, a four wheeled road vehicle is provided, comprising an electrical axle according to the first aspect.

BRIEF DESCRIPTION OF DRAWINGS

Hereinafter, the invention will be described with reference to the appended drawings, wherein.

DETAILED DESCRIPTION

Several embodiments of the present invention will be described in more detail below with reference to the accompanying drawings in order for those skilled in the art to be able to carry out the invention. The invention may, however, be embodied in many different forms and should not be construed as limited to the embodiments set forth herein. Rather, these embodiments are provided so that this disclosure will be thorough and complete, and will fully convey the scope of the invention to those skilled in the art. The embodiments do not limit the invention, but the invention is only limited by the appended claims. Furthermore, the terminology used in the detailed description of the particular embodiments illustrated in the accompanying drawings is not intended to be limiting of the invention.

Examples of drive line configurations of a vehicle are shown in FIGS. 1 to 6. In these embodiments, the vehicle 10 has a front axle 12 being connected to a rear axle 14, and a torque vectoring device 16.

Figure 1:
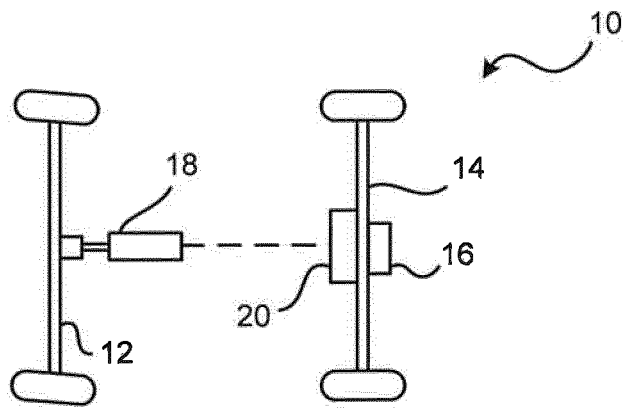
FIG. 1 is a schematic view of a vehicle according to an embodiment.

In FIG. 1, the front axle 12 is driven by means of a transmission 18, and the rear axle 14 is driven by means of an electrical motor 20. The torque vectoring device 16 is arranged at the electrical rear axle 14.

Figure 2:
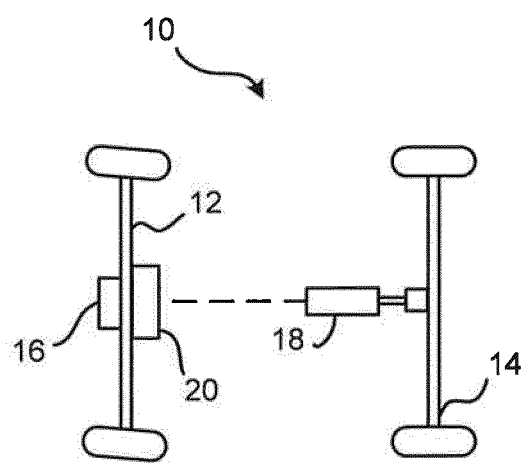
FIG. 2 is a schematic view of a vehicle according to another embodiment.

In FIG. 2, a similar configuration is shown but here the rear axle is driven by means of a transmission 18, and the front axle is driven by means of an electrical motor 20. Consequently, the torque vectoring device 16 is arranged at the electrical front axle.

Figure 3:
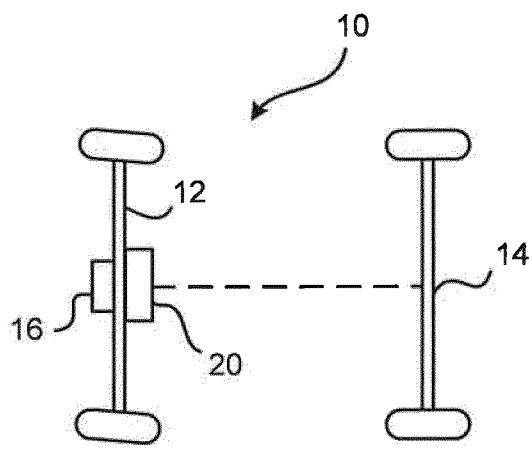
FIG. 3 is a schematic view of a vehicle according to a further embodiment.
Figure 4:
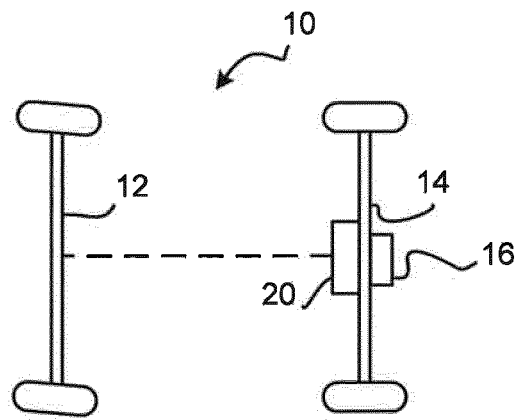
FIG. 4 is a schematic view of a vehicle according to a yet further embodiment.

FIGS. 3 and 4 show configurations where the front axle 12 or the rear axle 14 is driven by an electrical motor 20, wherein the torque vectoring device 16 is arranged at the driven electrical axle 12, 14.

Figure 5:
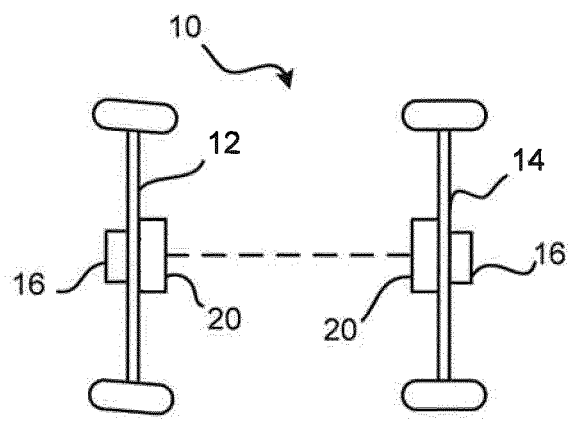
FIG. 5 is a schematic view of a vehicle according to another embodiment.

As a further example, FIG. 5 shows a configuration in which the front axle 12 and the rear axle 14 are driven by electrical motors 20. Torque vectoring devices 16 are arranged at each electrical axle 12, 14.

Figure 6:
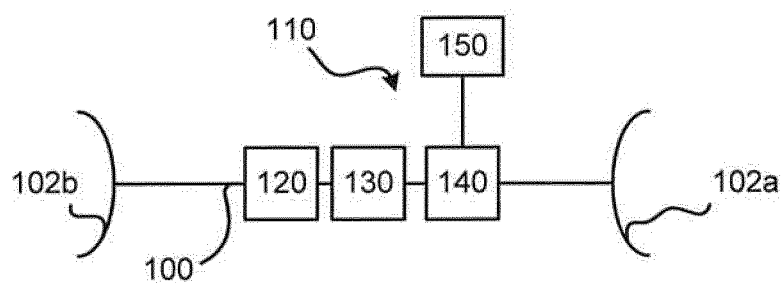
FIG. 6 is a schematic view of a torque vectoring device according to an embodiment.

With reference to FIG. 6, a basic setup of an electrical axle 100 including a torque vectoring device 110 is shown. A driving axle 100 of a vehicle is driven by means of a propulsion unit 120 and has two wheels 102a, 102b connected to opposite ends of the axle 100. The propulsion unit 120, provided as an electrical motor, is coupled to a differential mechanism 130 for allowing the wheels 102a, 102b to rotate at different velocities. An electrical motor 140 is connected to the differential mechanism 130, for providing a torque difference to opposite ends of the axle 100. A control means 150 is further connected to the electrical motor 140, and configured to calculate and transmit control signals to the electrical motor 140 of the torque vectoring device 110.

When the vehicle is travelling on a straight course, both wheels 102a, 102b will rotate at the same speed. In this situation, the electrical motor 140 will stand still. When the vehicle passes a surface having inhomogeneous friction, the torque vectoring device 110 may be used to enhance the traction potential of the driving axle 100. In such cases, the control means 150 sends a signal to the electrical motor 140 of the torque vectoring device 110 that will activate and apply a torque. Upon this, an increase of torque will be provided to one of the ends of the axle 100, and a corresponding torque decrease will be provided to the opposite end of the axle 100.

Figure 7:
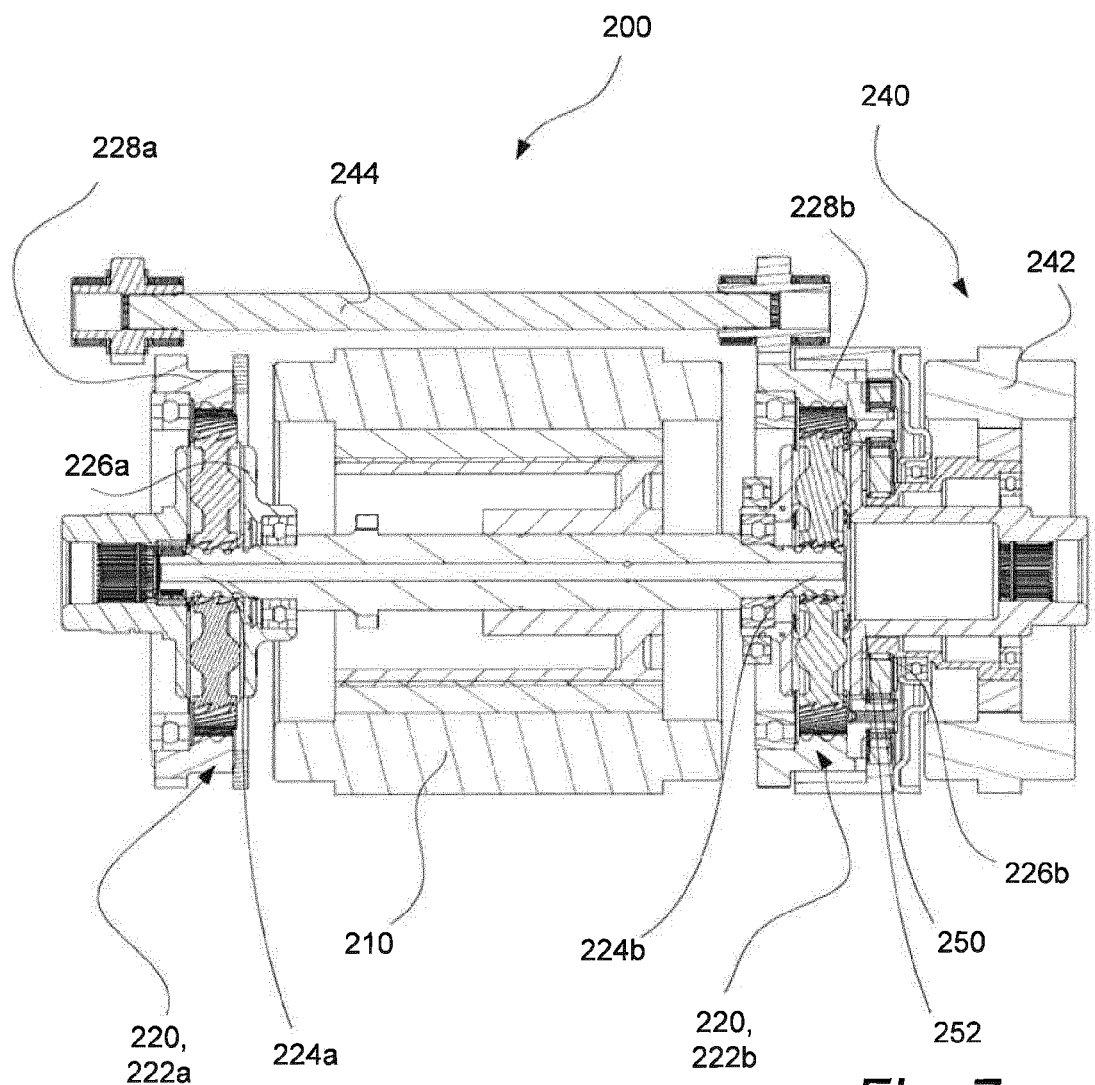
FIG. 7 is a cross sectional view of an electrical axle of a vehicle including a torque vectoring device according to an embodiment.

An embodiment of an electrical axle 200 of a vehicle including a torque vectoring device is shown in greater detail in FIG. 7. The electrical axle 200, which includes an electrical propulsion motor 210, a differential mechanism 220, and a torque vectoring device 240, is configured to be connected to a left wheel shaft and a right wheel shaft (not shown). The electrical propulsion motor 210 is arranged coaxially on the axle 200, and is connected on each lateral side to a differential mechanism 220 consisting of two coaxially aligned planetary gears 222a, 222b, of which the electrical propulsion motor 210 is driving the sun gears 224a, 224b. The left and right wheel shafts are connected to the planetary carriers 226a, 226b of the respective planetary gears 222a, 222b. The ring gear 228a, 228b of the respective planetary gear 222a, 222b has an outer surface which is connectable, e.g. by means of teeth, to the torque vectoring device 240.

The torque vectoring device 240 includes an electrical motor 242 arranged coaxially on the axle 200, such that the rotational axis of the motor 242 is aligned with the rotational axis of the electrical propulsion motor 210. The electrical motor 242 is further arranged distally of the differential mechanism 220, i.e. between one of the planetary gears 220a, 200b and the adjacent wheel shaft.

The electrical motor 242 of the torque vectoring device 240 is connected directly to the ring wheel 228b of the second planetary gear 222b, and connected to the ring wheel 228a of the first planetary gear 222a via a rotatable balancing shaft 244 extending parallel with the axle 200, and provided with gears for engagement with the ring gear 228a of the planetary gear 222a. The gears of the balancing shaft 244 are configured for transmitting torque to the planetary gear 222a upon rotation of the balancing shaft 244, wherein the torque transmitted to the planetary gear 222a has an opposite direction compared to the torque transmitted to the other planetary gear 222b directly.

The ring wheels 228a, 228b are coupled to the electrical motor via a cycloidal drive 250 for creating a gear reduction between the electrical motor 242 and the differential mechanism 220. The cycloidal drive 250 includes an eccentric input shaft 252 which is directly driven by the electrical motor 242. A cycloidal disc is directly connected to the input shaft 252 and free to rotate within a stationary ring wheel. Upon rotation, the disc is driving an output shaft including a disc with a plurality of rollers, which rollers are allowed to rotate within corresponding recesses in the disc.

Preferably, the gear reduction may be in the range of a factor 30 to 50, although other factors may also be applicable. Typical gear reduction requirements may be dependent on the desire for a low performance motor, which thus requires a high reduction, as well as on a desired low reduction in order to reduce the maximum speed of the motor.

In another embodiment, the output shaft of the cycloidal drive is the ring wheel, while the roller disc is held stationary.

Figure 8:
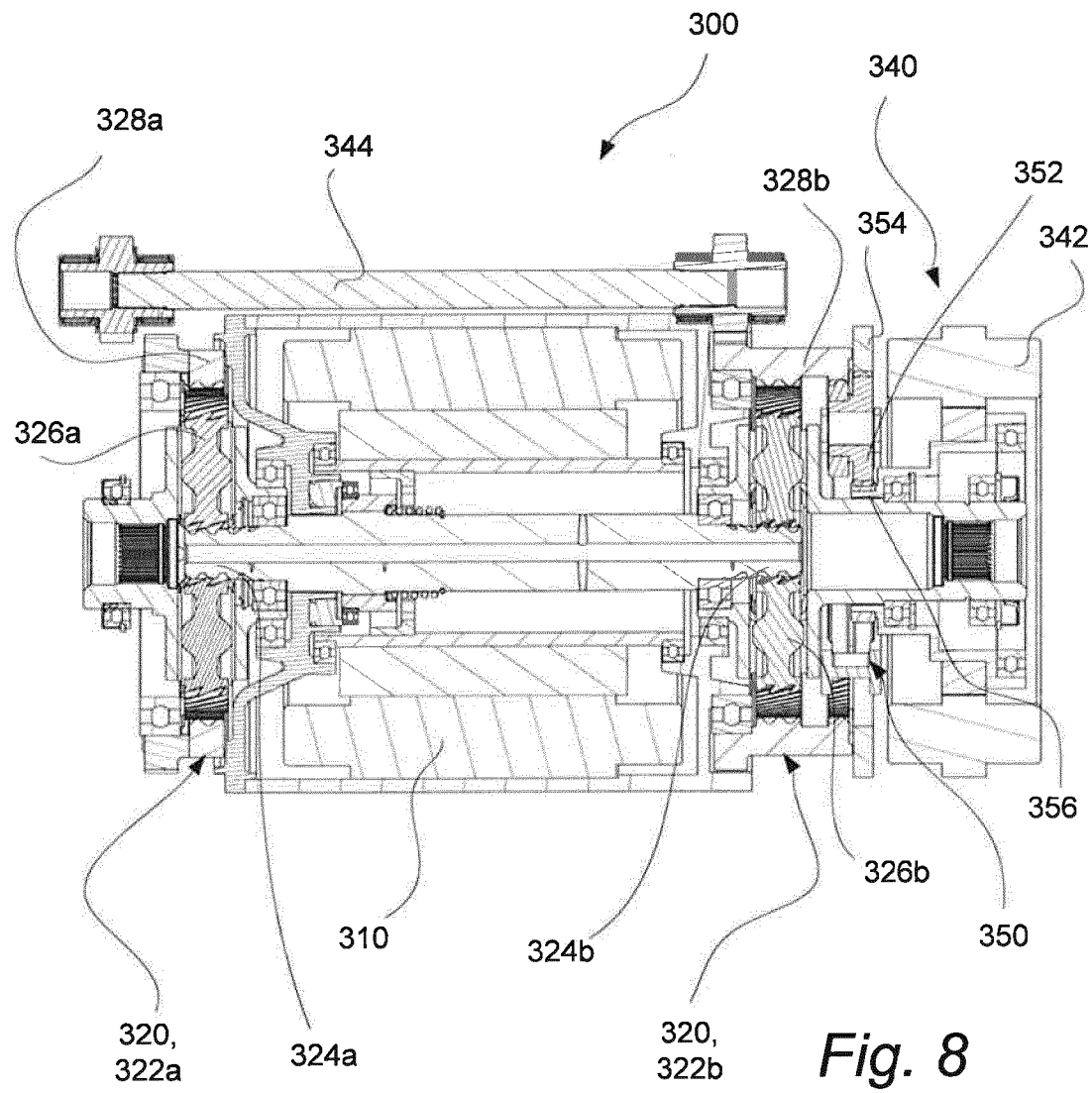
FIG. 8 is a cross sectional view of an electrical axle of a vehicle including a torque vectoring device according to another embodiment.

Now turning to FIG. 8, another embodiment of an electrical axle 300 is shown. The electrical axle 300 includes an electrical propulsion motor 310 and a differential mechanism 320 identical with what has previously been described with reference to FIG. 7. The torque vectoring device 340 differs from the previous embodiment in the choice of reduction gear 350, which in this case is a differential planetary gear. Such differential planetary gear is very compact and provides a greater gear reduction between the electrical motor 342 and the differential mechanism 320 than a regular planetary gear.

For example, if a gear reduction of a factor 50 is desired, it would normally require 3 or 4 planetary gears arranged in series. Hence, the choice of a differential planetary gear is highly advantageous.

Figure 9:
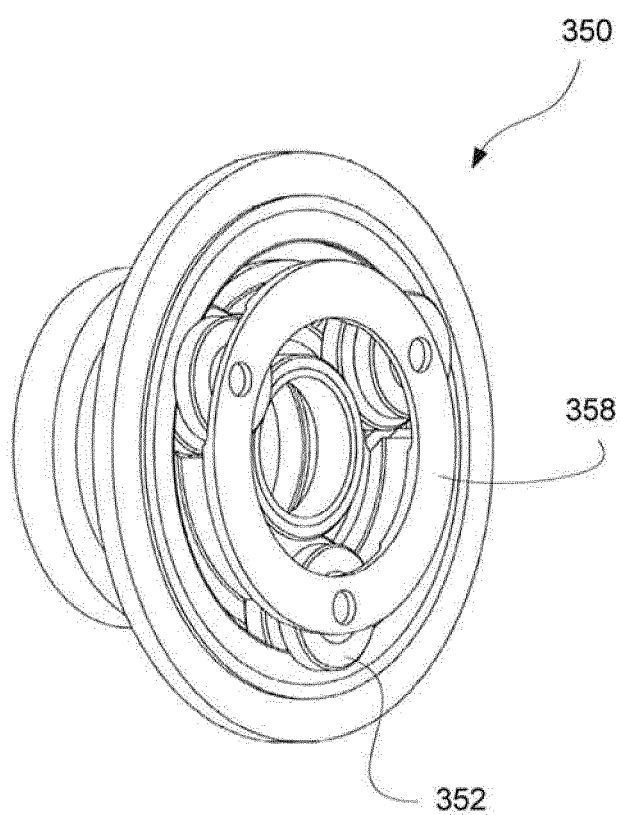
FIG. 9 is an isometric view of the gear change device shown in FIG. 8.

The differential planetary gear 350, which is also shown in FIG. 9, includes planets 352 having two different gears of which one is connected to the ring wheels of the planetary gears 322a, 322b of the differential mechanism, and the other is connected to stationary ring wheel 354. The second gear of the planets 352 is also connected to a sun wheel 356 which in turn is connected to the electrical motor 342. The planet carrier 358 is thus not connected to any of the axles.

Figure 10:
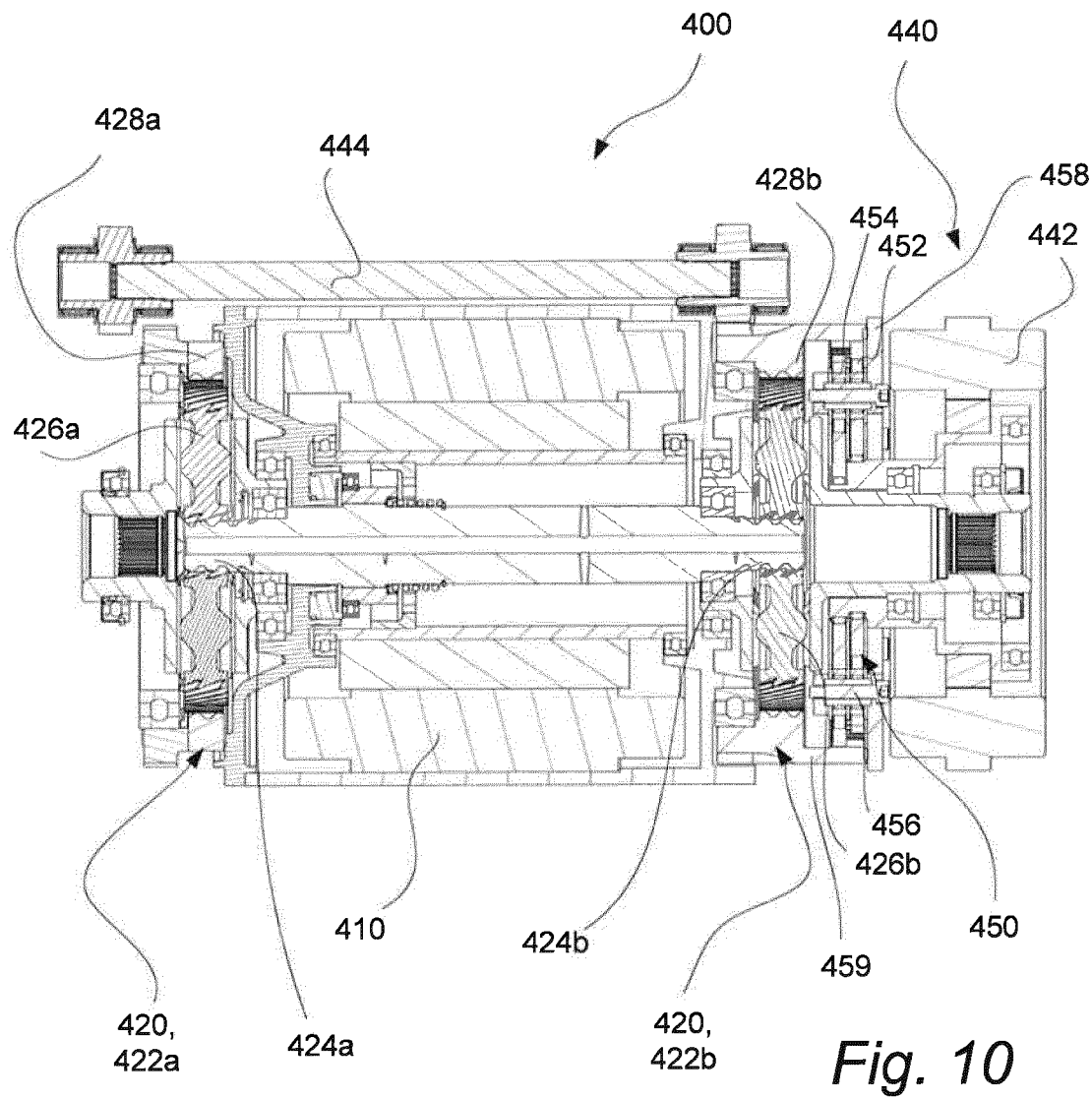
FIG. 10 is a cross sectional view of a torque vectoring device according to a further embodiment.

In FIG. 10 a third embodiment of an electrical axle 400 is shown. The electrical axle 400 includes an electrical propulsion motor 410 and a differential mechanism 420 identical with what has previously been described with reference to FIGS. 7 and 9. The torque vectoring device 440 differs from the previous embodiment in the choice of reduction gear 450, which in this case is a double cycloidal drive. Such double cycloidal drive is very compact and provides a greater gear reduction between the electrical motor 442 and the differential mechanism 420 than a regular planetary gear. Further, the use of a double cycloidal drive provides a balancing effect of radial reaction forces and balancing of weight, which means that the reduction gear allows a higher rotational speed.

A double cycloidal drive may e.g. operate up to 16.500 rpm, which is far more than a regular cycloidal drive as described above with reference to FIG. 7.

Figure 11:
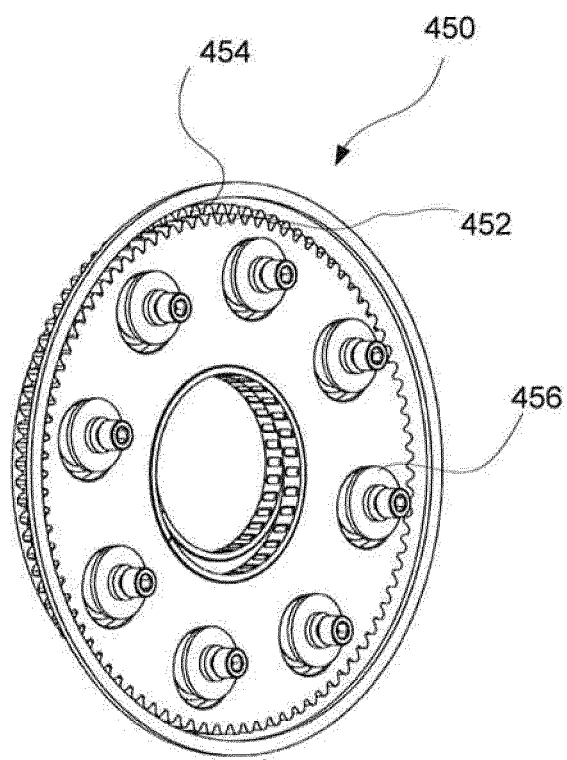
FIG. 11 is an isometric view of the gear change device shown in FIG. 10.

The double cycloidal drive, which is also shown in FIG. 11, comprises two discs 452, 454 which are arranged eccentric on the rotational shaft of the electrical motor 442. A plurality of rollers 456 are provided on a roller support 458 which is locked with respect to rotational movement. The eccentric movement of the discs 452, 454 provides a stepwise movement relative the ring wheel 459 of the cycloidal drive 450, whereby a gear reduction is achieved.

In a further embodiment the double cycloidal drive 450 is replaced by a multi-cycloidal drive comprising three or more discs which are arranged on the rotational shaft of the electrical motor.

In a yet further embodiment the gear reduction 250, 350, 450 is omitted, such that the electrical motor of the torque vectoring unit is connected directly the ring wheel of the second planetary gear of the differential mechanism, and to the ring wheel of the second planetary gear of the differential mechanism via the balancing shaft. Such embodiment is advantageous in that less components are used, although it requires extreme performance of the electrical motor.

It will be appreciated that the embodiments described in the foregoing may be combined without departing from the scope as defined by the appended patent claims. Although the present invention has been described above with reference to specific embodiments, it is not intended to be limited to the specific form set forth herein. Rather, the invention is limited only by the accompanying claims and, other embodiments than the specific above are equally possible within the scope of these appended claims.

In the claims, the term "comprises/comprising" does not exclude the presence of other elements or steps. Furthermore, although individually listed, a plurality of means, elements or method steps may be implemented by e.g. a single unit or processor. Additionally, although individual features may be included in different claims, these may possibly advantageously be combined, and the inclusion in different claims does not imply that a combination of features is not feasible and/or advantageous. In addition, singular references do not exclude a plurality. The terms "a", "an", "first", "second" etc do not preclude a plurality. Reference signs in the claims are provided merely as a clarifying example and shall not be construed as limiting the scope of the claims in any way.

The invention claimed is:

1. An electrical axle for a four wheeled road vehicle, comprising
   an electrical propulsion motor arranged coaxially on said axle,
   a first planetary gear connected to said electrical propulsion motor and to a first side of said axle, and a second planetary gear connected to said electrical propulsion motor and to a second side of said axle, said first and second planetary gears forming a differential mechanism, and
   a torque vectoring unit comprising an electrical motor arranged coaxially on said axle for providing a change in torque distribution between said first side and said second side of said axle, wherein
   said electrical motor of said torque vectoring unit is connected to the first and second planetary gears, and
   wherein said torque vectoring unit is driven solely by said electric motor to provide torque vectoring to both the first side of said axle and the second side of said axle.

2. An electrical axle for a four wheeled road vehicle, comprising
   an electrical propulsion motor arranged coaxially on said axle,
   a first planetary gear connected to said electrical propulsion motor and to a first side of said axle, and a second planetary gear connected to said electrical propulsion motor and to a second side of said axle, said first and second planetary gears forming a differential mechanism, and
   a torque vectoring unit comprising an electrical motor arranged coaxially on said axle for providing a change in torque distribution between said first side and said second side of said axle, wherein
   said electrical motor of said torque vectoring unit is connected to the first and second planetary gears, wherein said electrical motor is connected to the second planetary gear directly, and to the first planetary gear via a balancing shaft extending parallel with the electrical axle.

3. The electrical axle according to claim 1, wherein said first planetary gear has a first ring wheel and a first sun wheel, and said second planetary gear has a second ring wheel and a second sun wheel, and wherein said electrical motor is connected to the first and second ring wheels of the first and second planetary gears, and wherein the electrical propulsion motor is driving the first and second sun wheels of the first and second planetary gears.

4. An electrical axle for a four wheeled road vehicle, comprising
   an electrical propulsion motor arranged coaxially on said axle,
   a first planetary gear connected to said electrical propulsion motor and to a first side of said axle, and a second planetary gear connected to said electrical propulsion motor and to a second side of said axle, said first and second planetary gears forming a differential mechanism, and
   a torque vectoring unit comprising an electrical motor arranged coaxially on said axle for providing a change in torque distribution between said first side and said second side of said axle, wherein
   said electrical motor of said torque vectoring unit is connected to the first and second planetary gears,
   wherein the electrical motor of the torque vectoring unit is connected to the first and second planetary gears via a reduction gear.

5. The electrical axle according to claim 4, wherein said reduction gear is a cycloidal drive of which the electrical motor is driving an eccentric input shaft.

6. The electrical axle according to claim 4, wherein the first planetary gear has a first ring wheel and the second planetary gear has a second ring wheel, wherein said reduction gear is a cycloidal drive of which the electrical motor is driving an eccentric input shaft, said cycloidal drive further comprising at least two discs arranged on the eccentric input shaft, a roller support carrying a plurality of rollers connected to the first and second ring wheels of the first and second planetary gears, and a stationary ring wheel.

7. The electrical axle according to claim 4, wherein the first planetary gear has a first ring wheel and the second planetary gear has a second ring wheel, wherein said reduction gear is a differential planetary gear comprising a stationary ring wheel connected to a first gear of a plurality of planets, and a sun wheel connected to the electrical motor of the torque vectoring unit, wherein a second gear of the planets is connected to at least one of the first and second ring wheels of the first and second planetary gears of the differential mechanism.

8. The electrical axle according to claim 4, wherein the reduction gear is connected to the second planetary gear directly, and to the first planetary gear via a balancing shaft extending parallel with the electrical axle.

9. The electrical axle according to claim 1, wherein said electrical motor of the torque vectoring unit, upon activation, applies a positive torque on one of said first and second planetary gears and a negative torque on the other of said first and second planetary gears.

10. The electrical axle according to claim 1, wherein a reduction gear is arranged coaxially on said electrical axle.

11. The electrical axle according to claim 1, wherein the electric axle has a left wheel shaft and a right wheel shaft, wherein the first planetary gear has a first sun gear and a first planet carrier, wherein the second planetary gear has a second sun gear and a second planet carrier, wherein the electrical propulsion motor is connected to the first and second sun gears of the first and second planetary gears, and wherein the first and second planet carriers of the first and second planetary gears are connected to the respective left and right wheel shafts.

12. A four wheeled road vehicle, comprising: an electrical axle, an electrical propulsion motor arranged coaxially on said axle,
    a first planetary gear connected to said electrical propulsion motor and to a first side of said axle, and a second planetary gear connected to said electrical propulsion motor and to a second side of said axle, said first and second planetary gears forming a differential mechanism, and
    a torque vectoring unit comprising an electrical motor arranged coaxially on said axle for providing a change in torque distribution between said first side and said second side of said axle, wherein
said electrical motor of said torque vectoring unit is connected to the first and second planetary gears, wherein said torque vectoring unit is driven solely by said electric motor to provide torque vectoring to both the first side of said axle and the second side of said axle.

\* \* \* \* \*